United States Patent
Abramowitz et al.

(10) Patent No.: US 6,441,831 B1
(45) Date of Patent: Aug. 27, 2002

(54) CHOOSING A MULTIMEDIA PRESENTATION

(75) Inventors: Josh Abramowitz, New York, NY (US); Samuel J. Aaronson, Brookline, MA (US)

(73) Assignee: LearningAction, Inc., Boston, MA (US)

( * ) Notice: Subject to any disclaimer, the term of this patent is extended or adjusted under 35 U.S.C. 154(b) by 0 days.

(21) Appl. No.: 09/542,120

(22) Filed: Apr. 4, 2000

(51) Int. Cl.[7] .............................................. G06F 15/00
(52) U.S. Cl. ....................................................... 345/716
(58) Field of Search ................................. 345/716, 719, 345/727, 733, 744, 746, 760, 764; 707/500.1, 501.1; 709/231–235

(56) References Cited

U.S. PATENT DOCUMENTS

| | | | | |
|---|---|---|---|---|
| 5,758,076 A | * | 5/1998 | Wu et al. | 709/231 |
| 5,822,537 A | | 10/1998 | Katseff et al. | 709/231 |
| 5,956,729 A | | 9/1999 | Goetz et al. | 707/104.1 |
| 6,105,042 A | | 8/2000 | Aganovic et al. | 707/500 |
| 6,292,834 B1 | * | 9/2001 | Ravi et al. | 709/233 |

* cited by examiner

Primary Examiner—Crescelle N. dela Torre
(74) Attorney, Agent, or Firm—Fish & Richardson P.C.

(57) ABSTRACT

A method of presenting multimedia information on a computer includes: playing a test presentation; determining a processing speed of the computer based on a playing time of the test multimedia presentation; selecting multimedia information based on the determined processing speed; and displaying the selected multimedia information.

23 Claims, 10 Drawing Sheets

```
<HTML><HEAD><TITLE>Speed Test</TITLE>
<META HTTP-EQUIV="Refresh" CONTENT=10 URL="install_macromedia.html">
                42a              42b         42c
</HEAD>

<BODY>
<object CLASSID="clsid:D27CDB6E-AE6D-11cf-96B8-444553540000"
WIDTH="100%" HEIGHT="100%"
CODEBASE="http://active.macromedia.com/flash3/cabs/">

<param name="MOVIE" value="/servlet/SwfGenerator?tm=9&of=/MacroTest.swf">
<param name="PLAY" value="true">
<param name="LOOP" value="false">
<param name="QUALITY" value="high">
<param name="SCALE" value="SHOWALL">

<embed SRC="/servlet/SwfGenerator?tm=9&of=/MacroTest.swf" WIDTH="100%"
HEIGHT="100%" PLAY="true" LOOP="false"
QUALITY="high" SCALE="SHOWALL"
PLUGINSPAGE="http://www.macromedia.com/shockwave/download/
       index.cgi?P1_Prod_Version=ShockwaveFlash">

</object>
</p>
</BODY>
</HTML>
```

FIG. 4

```
<HTML><HEAD><TITLE>Speed Test</TITLE>
<META
HTTP-EQUIV="Refresh" CONTENT=10 URL="test.jsp?tm=9&proc_speed=slow">
</HEAD>

<BODY>
<object CLASSID="clsid:D27CDB6E-AE6d-11cf-96B8-444553540000"
WIDTH="100%" HEIGHT="100%"
CODEBASE="http://active.macromedia.com/flash3/cabs/">
<param name="MOVIE" value="/servlet/SwfGenerator?of=/DetectProcSpeed.swf">
<param name="PLAY" value="true">
<param name="LOOP" value="false">
<param name="QUALITY" value="high">
<param name="SCALE" value="SHOWALL">

<embed SRC="/servlet/SwfGenerator?tm=9&of=/DetectProcSpeed.swf"
WIDTH="100%" HEIGHT="100%" PLAY="true" LOOP="false"
QUALITY="high" SCALE="SHOWALL"
PLUGINSPAGE="http://www.macromedia.com/shockwave/download/
        index.cgi?P1_Prod_Version=ShockwaveFlash">

</object>
</p>
</BODY>
</HTML>
```

FIG. 5

CHOOSING A MULTIMEDIA PRESENTATION

TECHNICAL FIELD

This invention relates to presenting multimedia information, and more particularly to choosing a multimedia presentation.

BACKGROUND

Server computers are often used to present information over a network, such as the Internet, an extranet or an intranet, for display on a client computer. The presented information may be a time-ordered sequence, or stream, of multimedia information, such as image frames captured from a moving object or sound amplitude signals associated with a sound or voice.

Macromedia Flash™, available from Macromedia Inc., is sometimes used to display files representing multimedia streams. The Macromedia files contain a multimedia presentation consisting of a timeline of frames. The frames may contain graphics with associated audio, similar to the frames in a movie clip. Each frame is displayed for predetermined duration before the next frame in the timeline is displayed. As the timeline advances, the frames are displayed in sequence, creating an animated picture. Alternatively, the frames may contain commands that cause Macromedia Flash™ to perform actions that are associated with the commands.

Different multimedia streams, may have different presentation requirements. For example, a multimedia movie stream with a large number of simultaneously displayed symbols in motion that also has a lot of color effects requires a lot of computer processing power to display, while a movie with a lot of sound and image resolution may require an internet connection with a high bandwidth to download the required high resolution information.

SUMMARY

In general, one aspect of the invention relates to a method of presenting multimedia information on a computer including: playing a test presentation; determining a processing speed of the computer based on a playing time of the test presentation; selecting multimedia information based on the determined processing speed; and displaying the selected multimedia information.

In general, another aspect of the invention relates to a multimedia presentation, stored on a computer-readable medium, including: a test presentation; a first presentation of multimedia information; a second presentation of multimedia information; and a control file for causing a processor to select and display one of the first and second presentations according to the previously described method.

In general, yet another aspect of the invention relates to a multimedia presentation including a control file for causing a processor to perform the previously described method.

Embodiments of the invention may include one or more of the following. The processing speed of the computer is determined based on whether or not a refresh directive contained within a hypertext markup language file is executed before the playing of the test presentation is completed. The hypertext markup language file includes a link to the test presentation.

The method includes determining a speed of a network prior to selecting the multimedia information and then selecting of the multimedia information is based on the determined speed of the network. The selected multimedia information is loaded over the network before it is displayed. The speed of the network is determined based on a loading time of a test presentation, which is loaded over the network. The method includes playing a test presentation that includes sound information prior to selecting the multimedia information and then determining whether a user heard the sound information. The multimedia information is selected based on whether or not the user heard the sound information. Determining whether the user heard the sound information includes: asking the user whether the sound information was heard and checking the users response.

At least one of the test presentation and the multimedia information is represented in a Macromedia Flash file, Windows Media format, Real Video format, or QuickTime format. The test presentation is a Macromedia Flash presentation for display on a web browser and the method includes determining whether a Macromedia Flash plugin is installed on the web browser, prior to selecting the multimedia information. The multimedia information is selected based on whether the plugin is installed.

The invention chooses a multimedia information for displaying to a user based on the speed of the processor on the user's computer, the speed of the network connection, the ability of the user's computer to play sound, and so forth. It allows a multimedia developer to create presentations that have different requirements and present each user with the best presentation quality that can be supported by the users computer and network connection.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 4 shows a HTML test file for determining whether a user's computer has a Macromedia Flash plugin installed;

FIG. 5 shows a HTML test file for determining the processing speed of a user's computer;

Like reference symbols in the various drawings indicate like elements;

DETAILED DESCRIPTION

Figure 1:
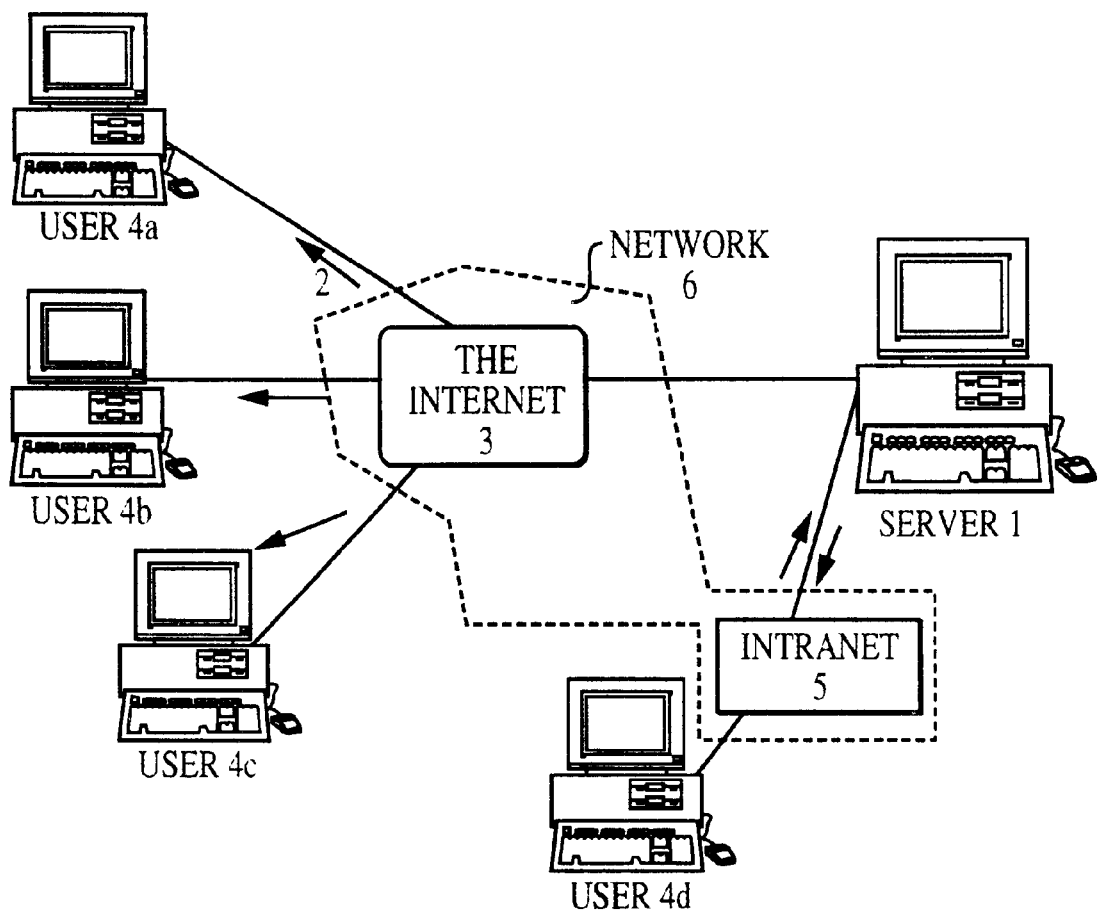
FIG. 1 is a block diagram of a network of computers including a server for presenting multimedia information to client computers.

Referring to FIG. 1, a server 1 presents multimedia information 2 over a network 6 to multiple users 4a–4d. The network 6 includes the Internet 3, an intranet 5, and an extranet (not shown). Alternatively, instead of accessing multimedia information over the network 6, a user may directly access the multimedia information using a web browser on a display (not shown) associated with the server 1.

Figure 2A:
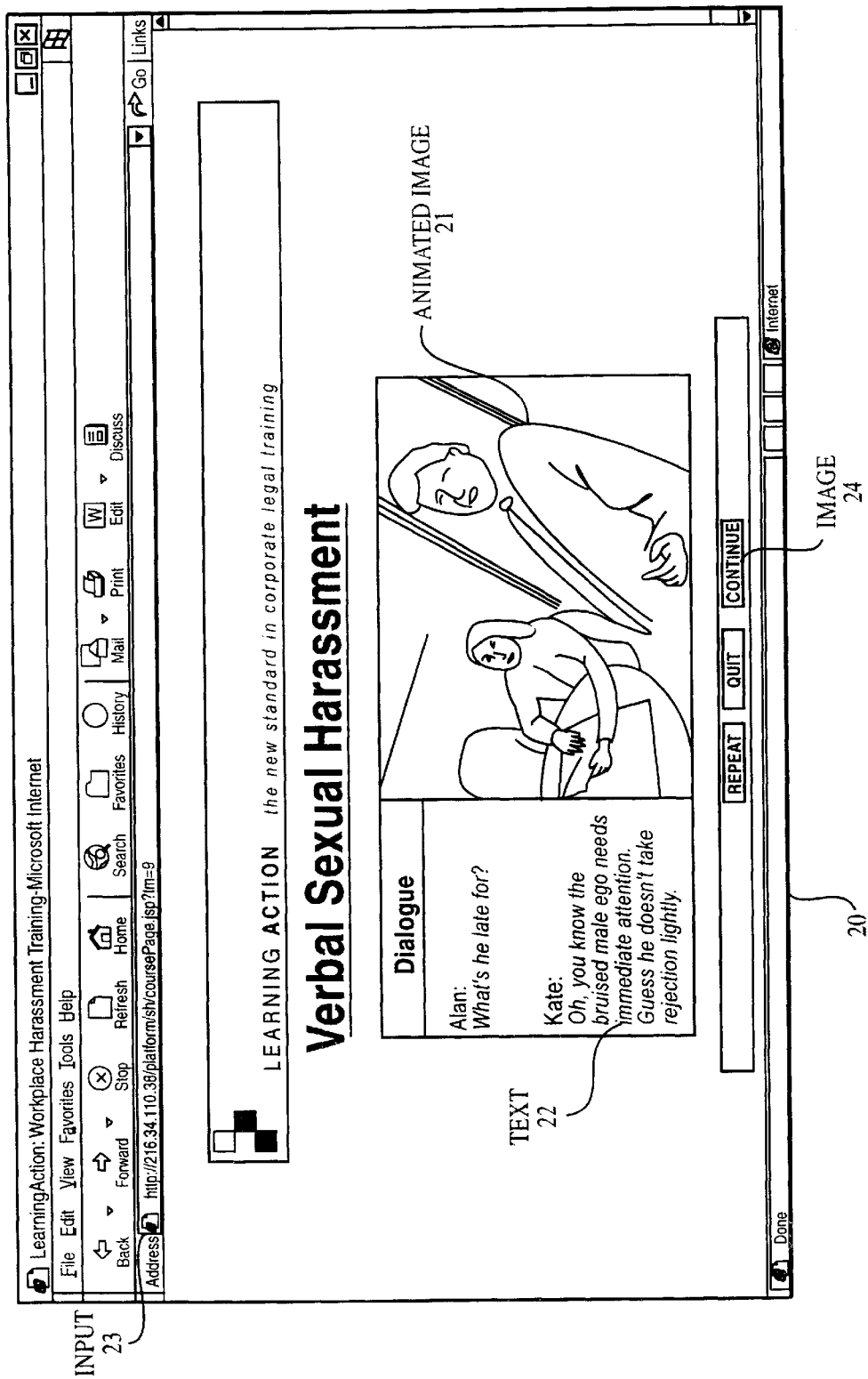
FIG. 2A is a snapshot of a multimedia stream displayed on a client computer of FIG. 1.

Referring to FIG. 2A, a user 4a–4d may view the multimedia information 2 on a suitably equipped user computer (not shown) that has a web browser 20 by typing a uniform resource location (URL) associated with the multimedia information in an address input 23 of the web browser 20. The multimedia information 2 includes an animated image 21, text 22 (which may or may not be animated), and a sound signal (not shown). An image 24 that is not animated is also included with the multimedia information 2. The web browser requires additional software, such as a Macromedia Flash plugin, to display the multimedia presentation. Other embodiments may use other plugins or stand-alone programs, such as RealPlayer™ by RealNetworks Inc., a Windows Media Viewer™ by Microsoft Inc, and so forth to display the multimedia information.

Figure 2B:
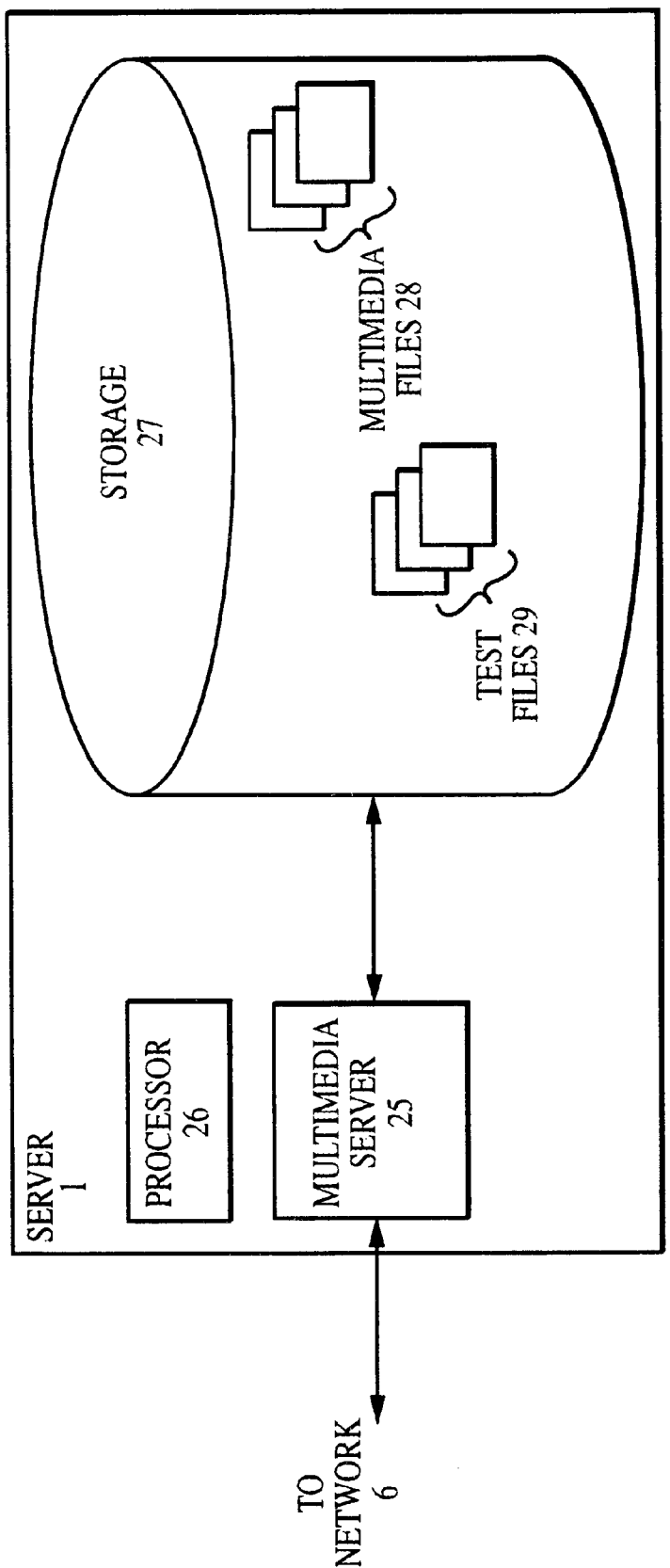
FIG. 2B is a block diagram of the server of FIG. 1.

Referring to FIG. 2B, the server 1, includes a processor 26 for executing computer programs and storage 27 associated with the processor 26. Storage 27 may be a computer memory, a hard disk, a hard disk array, a tape disk, a floppy disk or a CDROM. Server 1 also includes a multimedia server 25, which is a software program executed by the processor 26 to present multimedia information. The multimedia server 25 program may be stored within storage 27 and retrieved from storage prior to the processor 26 executing the program. The presented multimedia information is also stored in storage 27. The multimedia information includes multimedia files 28 and test files 29 for determining whether the network 6 and a user's computer meet the presentation requirements of the multimedia files 28.

Figure 3:
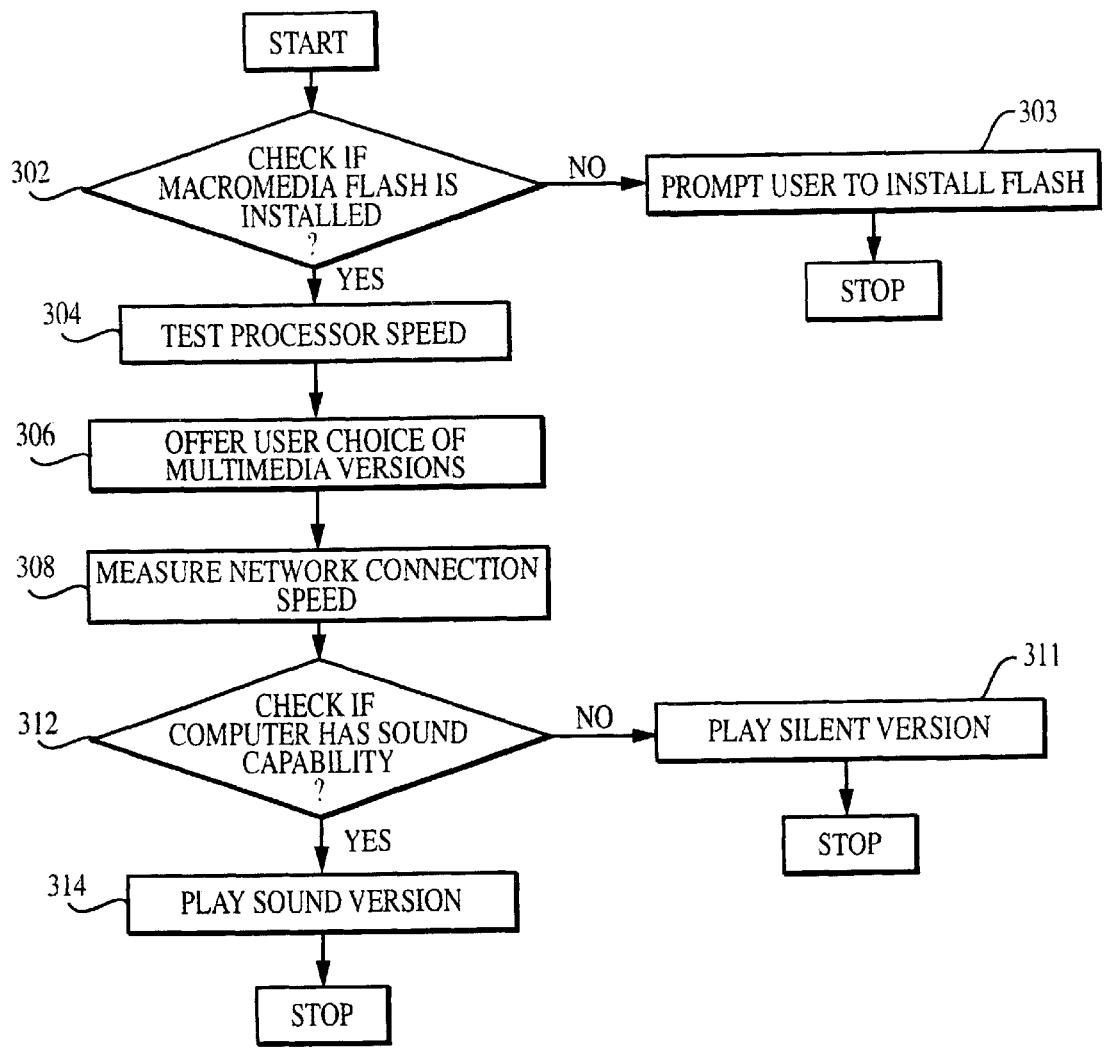
FIG. 3 is a flow chart of a procedure for choosing a multimedia presentation using a set of test files.

Referring to FIG. 3, a process, according to the invention, of choosing a multimedia presentation will be described. The process begins by checking 302 whether a Macromedia Flash plugin is installed on the browser 20. If the Flash plugin is not installed, the presentation prompts 303 the user 4a–4d to install Flash and then stops. Otherwise, if the Flash plugin is installed, the process tests 304 the processor speed of the user's computer to determine which presentations can be supported by the processor. The process then offers 306 the user a choice of different multimedia presentation versions that are supported by the processor of the user's computer, and waits for the user to select one of the versions. The process then measures 308 the connection speed of the network 6, to determine the kinds of multimedia presentations that are supported by the network.

The process checks 312 whether the user's computer is capable of playing sound. If the user's computer is incapable of playing sound, the process plays 311 a silent version of the multimedia presentation that is supported by the processor speed and the network connection speed of the user's computer. Otherwise, if the user's computer is capable of playing sound, the process plays 314 a version of the multimedia presentation that includes sound and is supported by the processor speed and the network connection speed of the user's computer.

Thus, the process automatically chooses a multimedia presentation based on the processor speed of the user's computer, the ability of the user's computer to play sound, and the speed of the network connection. The process can be extended to choose the multimedia presentation based on other known tests which determine, for example, the available memory on the user's computer, the available storage on the user's computer, and so on.

The process for determining whether a Flash plugin is installed on a user's computer is described in great detail in Macromedia Technology note number 14086, which is titled "How to detect the Flash 4 Player without using JavaScript." The full text of technology note number 14086 is included in appendix A of this patent application.

Referring to FIG. 4, a hypertext markup language (HTML) file 40 for checking 302 (FIG. 3) whether a Flash plugin is installed on a user's computer will be briefly described. The file 40, includes a link 44 for embedding a multimedia presentation, which is contained within a Flash file 44. The flash file 44 contains a getURL action, which redirects the web browser 20 to display the next web page in the presentation sequence. However, the getURL action is only executed if the web browser 20 has a flash plugin installed. Otherwise, the flash file 44 is never played and the getURL action is never executed.

The HTML file 40 also includes a HTML refresh directive 42 that causes the web browser 20 to wait for a timeout period 42b (10 seconds) and then display a web page 42c, which prompts 303 (FIG. 3) the user to install a Flash plugin. If the getURL action of the flash file 44 is not executed, the refresh directive 42 causes the web browser 20 to display the web page 42c, prompting 303 the user to install a Flash plugin. Otherwise, the getURL action redirects the web browser 20 to display the next web page in the presentation sequence before the timeout period 42b expires, thereby preempting the refresh directive 42. Thus the HTML file 40 determines whether a Flash plugin is installed on the user's computer.

Referring to FIG. 5, a hypertext markup language (HTML) file 50 for testing 304 (FIG. 3) the speed of the processor on a user's computer will be described. The file 50 includes a link 54 for embedding a multimedia presentation, which is contained within a Flash file 54. The flash file 54 contains a multimedia presentation that takes a lot of processor time to display. The flash file may contain a large number of simultaneously displayed symbols in motion with a lot of color effects. After the multimedia presentation, the flash file 54 contains a getURL action, which directs the web browser 20 to display a web page that is associated with computers that have fast processors.

The HTML file 50 also includes a HTML refresh directive 52 that causes the web browser 20 to wait for a timeout period 52b (10 seconds) and then display a web page 52c. The URL for the web page includes information 52e that indicates to the server 1 that the processor on the user's computer is slow. The URL for the web page also includes a session identifier 52d which the server uses to associate the information about the processor speed with the user.

If the processor on the user's computer is slow, the getURL action of the flash file 54 is not executed before the timeout period 52b expires. Consequently, the refresh directive 52 causes the web browser 20 to display the web page 52c, indicating that the processor on the user's computer is slow. Otherwise, the getURL action redirects the web browser 20 to display the web page associated with a fast processor before the timeout period 52b expires, thereby preempting the refresh directive 52. Thus the HTML file 50 tests 304 (FIG. 3) the speed of the processor on the user's computer.

Figure 6:
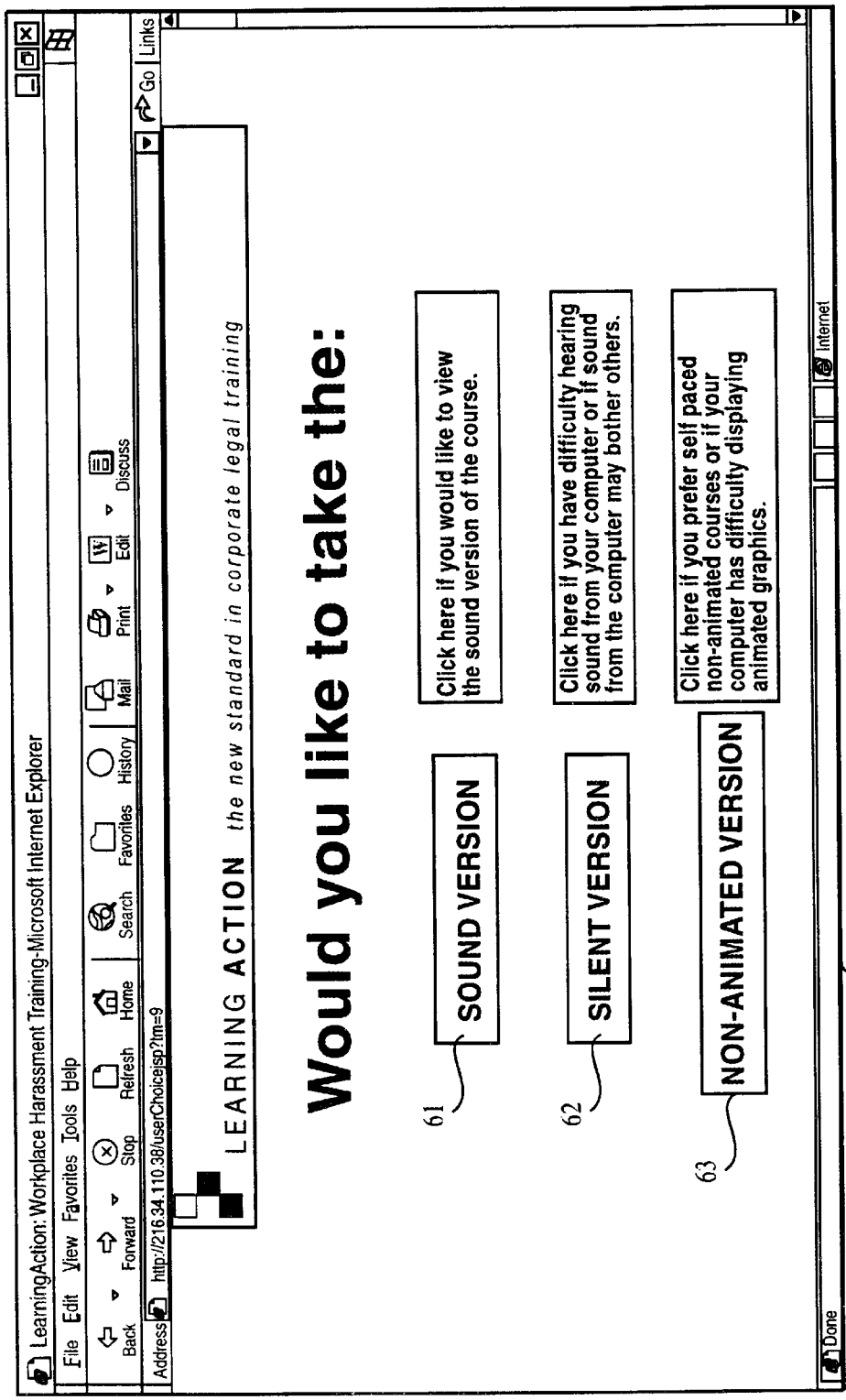
FIG. 6 shows a web page for prompting a user to select a preferred multimedia presentation version.

Referring to FIG. 6, a HTML file 60 for offering 306 (FIG. 3) a choice of multiple presentation versions to a user will be described. The user may choose between a version that includes sound 61, a silent version 62, and a non-animated version 63 by using a mouse pointer associated with the users computer on the selected choice. For example, a user in a public place, such as a library, may choose a silent version if the sound from the presentation is likely to disturb others.

Figure 7A:
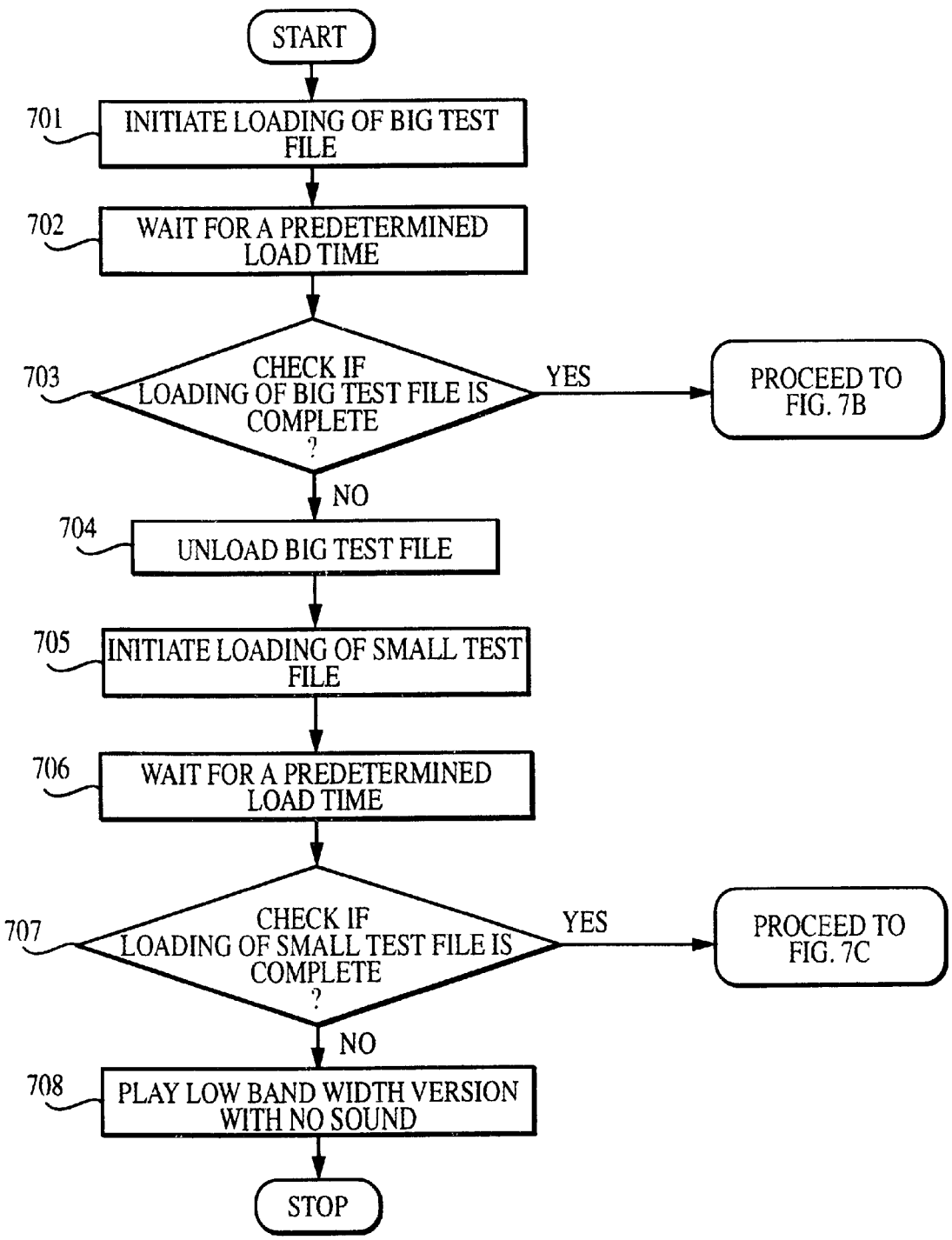
FIG. 7A is a flow chart of the procedure for determining the speed of the network.

Referring to FIG. 7A, the process for measuring 308 (FIG. 3) the speed of the network connection will be described. The process begins by initiating 701 the loading of a big test multimedia presentation file. The process then waits 702 for predetermined load time and then checks 703 whether the loading of the big test file is complete. If the loading is complete, then the speed of the network 6 is high. The process continues as described for FIG. 7B below. Otherwise, if the loading is incomplete, the process unloads 704 the big test file and initiates 705 the loading of a small test file. The process waits 706 for a predetermined load time and then checks 707 whether the loading of the small test file is complete. If the loading of the small test file is complete, the process continues as described for FIG. 7C below. Otherwise, if the loading is incomplete then the network connection speed is very low, i.e. the bandwidth is very low. The process plays 708 a very low bandwidth version of the presentation with no sound and then stops.

Figure 7B:
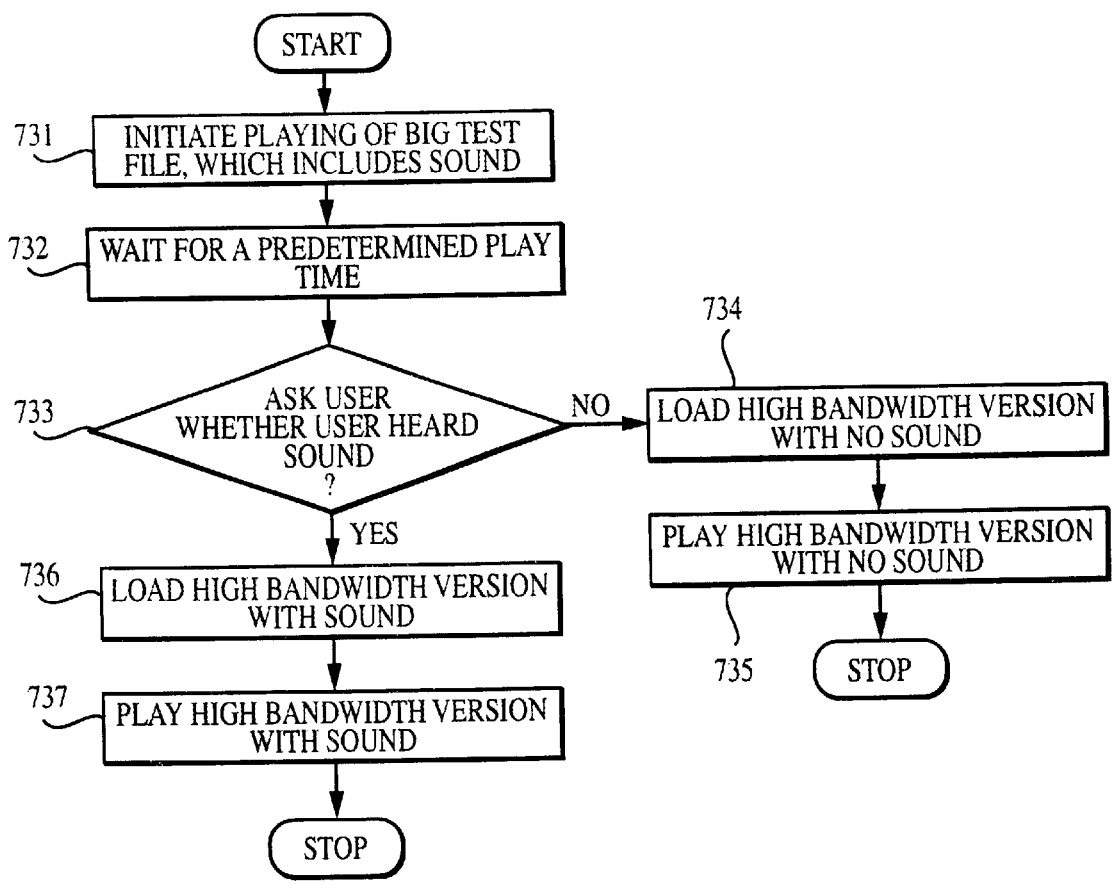
FIG. 7B is a flow chart of the procedure for determining whether or not to include sound when playing a high bandwidth presentation.
Figure 7C:
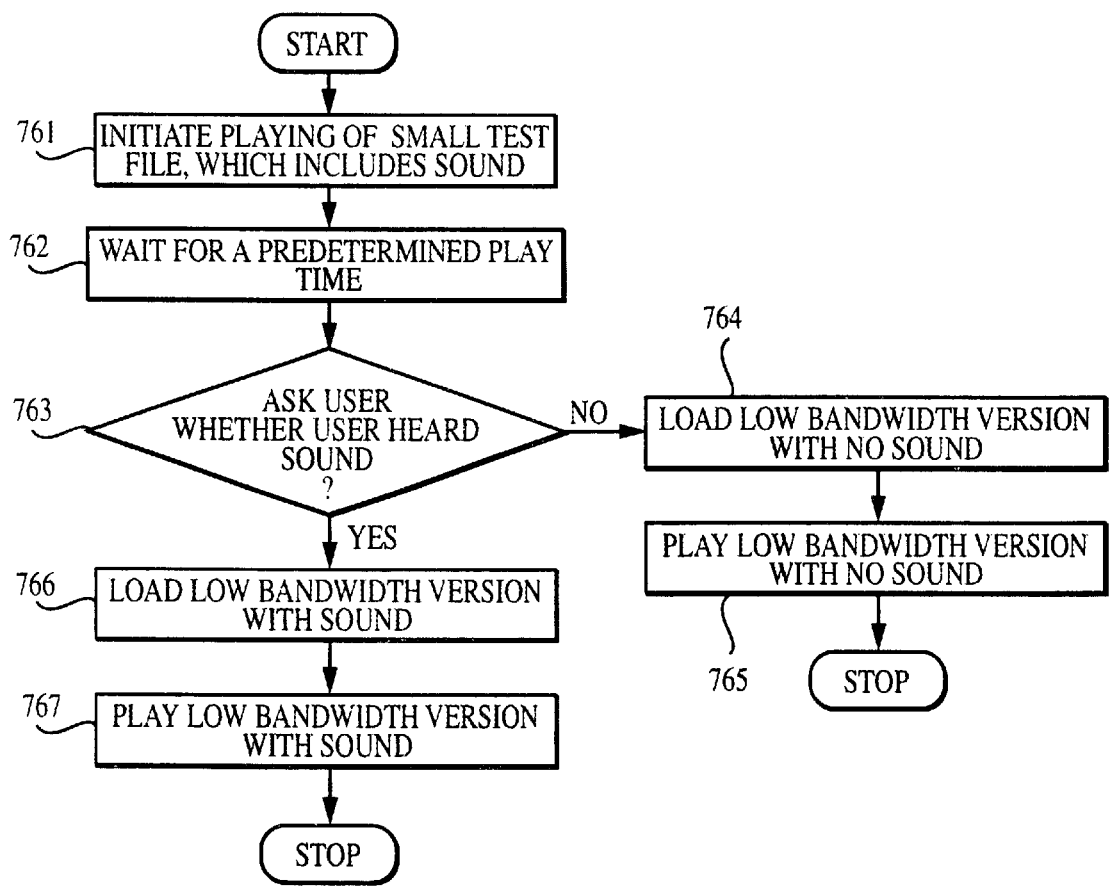
FIG. 7C is a flow chart of the procedure for determining whether or not to include sound when playing a low bandwidth presentation.

Referring to FIGS. 7B and 7C, the process for checking 312 (FIG. 3) the sound capability of the user's computer will be described. The FIGs are similar, except FIG. 7B depicts the process for a high-speed network connection while FIG. 7C depicts the process for a low-speed network connection. The process begins by initiating 731, 761 the playing of a test file that was previously loaded 701, 705 and then waiting 732, 762 for a predetermined play time. The process then asks 733, 763 the user whether the sound associated with the test file was heard by the user. If the sound was not heard, a silent version of the presentation is loaded 734, 764 and played 735, 765. Otherwise, if the sound was heard, a version of the presentation that has sound is loaded 736, 766 and played 737, 767.

In implementing the presentation using Macromedia flash, presentation files are loaded and unloaded by, respectively, executing the "load movie" and "unload movie" commands of Macromedia Flash. The status of the loading of a file can be checked using the "If frame loaded" clause of Macromedia flash. The processes described for FIGS. 7A–7C may be implemented in Macromedia Flash control file using commands contained within a sequence of multimedia frames. Alternatively, the processes may be implemented as separate standalone programs.

Other embodiments are within the scope of the following claims.

What is claimed is:

1. A method of presenting multimedia information on a computer, comprising:
    playing a test presentation;
    determining a processing speed of the computer based on a playing time of the test presentation;
    selecting multimedia information based on the determined processing speed; and
    displaying the selected multimedia information.

2. The method of claim 1, wherein the processing speed of the computer is determined based on whether or not a refresh directive contained within a hypertext markup language file is executed before the playing of the test presentation is completed.

3. The method of claim 2, wherein the hypertext markup language file includes a link to the test presentation.

4. The method of claim 1, further comprising, prior to selecting the multimedia information:
    determining a speed of a network, the selecting of the multimedia information being based on the determined speed of the nework.

5. The method of claim 1, further comprising, prior to displaying the selected multimedia information:
    loading the multimedia information over the network.

6. The method of claim 4, wherein the speed of the network is determined by:
    loading a test presentation over the network;
    determining the speed of the network based on a loading time of the test presentation.

7. The method of claim 1, wherein at least one of the test presentation and the multimedia information is represented in a Macromedia Flash file.

8. The method of claim 1, wherein at least one of the test presentation and the multimedia information is represented in at least one of Windows Media, Real Video and Quick-Time.

9. The method of claim 1, further comprising, prior to selecting the multimedia information:
    playing a test presentation that includes sound information;
    determining whether the sound information was heard by a user, the selecting of the multimedia information being based on whether or not the sound information was heard by the user.

10. The method of claim 9, wherein the determining whether the sound information was heard includes:
    asking the user whether the sound information was heard;
    checking the user's response to the asking.

11. The method of claim 1, wherein the test presentation is a Macromedia Flash presentation for display on a web browser, the method further comprising, prior to selecting the multimedia information:
    determining whether a Macromedia Flash plugin is installed on the web browser, the selecting of the multimedia information being based on whether the plugin is installed.

12. A multimedia presentation, stored in a computer-readable medium, comprising:
    a test presentation;
    a first presentation of multimedia information;
    a second presentation of multimedia information; and
    a control file for causing a processor to:
        play the test presentation;
        determine a processing speed of the processor based on a playing time of the test presentation;
        select between the first presentation and the second presentation of multimedia information based on the determined processing speed; and
        display the selected multimedia information.

13. The presentation of claim 12, wherein the processing speed of the computer is determined based on whether or not a refresh directive contained within a hypertext markup language file is executed before the playing of the test presentation is completed.

14. The presentation of claim 13, wherein the hypertext markup language file includes a link to the test presentation.

15. The presentation of claim 12, further comprising, prior to selecting the multimedia information:
    determining a speed of a network, the selecting of the multimedia information being based on the determined speed of the nework.

16. The presentation of claim 12, further comprising, prior to displaying the selected multimedia information:
   loading the multimedia information over the network.

17. The presentation of claim 15, wherein the speed of the network is determined by:
   loading a test presentation over the network;
   determining the speed of the network based on a loading time of the test presentation.

18. The presentation of claim 12, wherein at least one of the test presentation and the multimedia information is represented in a Macromedia Flash file.

19. The method of claim 12, wherein at least one of the test presentation and the multimedia information is represented in at least one of Windows Media, Real Video and QuickTime.

20. The presentation of claim 12, further comprising, prior to selecting the multimedia information:
   playing a test presentation that includes sound information;
   determining whether the sound information was heard by a user, the selecting of the multimedia information being based on whether or not the sound information was heard by the user.

21. The presentation of claim 20, wherein the determining whether the sound information was heard includes:
   asking the user whether the sound information was heard;
   checking the user's response to the asking.

22. The presentation of claim 12, wherein the test presentation is a Macromedia Flash presentation for display on a web browser, the method further comprising, prior to selecting the multimedia information:
   determining whether a Macromedia Flash plugin is installed on the web browser, the selecting of the multimedia information being based on whether the plugin is installed.

23. A multimedia presentation controller, stored in a computer-readable medium, comprising:
   a control file for causing a processor to:
      play a test presentation;
      determine a processing speed of the processor based on a playing time of the test presentation;
      select between a first presentation and a second presentation of multimedia information based on the determined processing speed; and
      display the selected multimedia information.

* * * * *